United States Patent
Friedman et al.

(10) Patent No.: US 7,720,136 B2
(45) Date of Patent: May 18, 2010

(54) ADAPTIVE CODING AND MODULATION BASED ON LINK PERFORMANCE PREDICTION

(75) Inventors: Jonathan Friedman, Tel Aviv (IL); Ran Sofer, Tel Mond (IL)

(73) Assignee: Provigent Ltd, Herzliya (IL)

( * ) Notice: Subject to any disclaimer, the term of this patent is extended or adjusted under 35 U.S.C. 154(b) by 710 days.

(21) Appl. No.: 11/645,828

(22) Filed: Dec. 26, 2006

(65) Prior Publication Data

US 2008/0155373 A1 Jun. 26, 2008

(51) Int. Cl.
*H04B 1/38* (2006.01)

(52) U.S. Cl. .................. 375/220; 375/221; 375/222; 375/232; 375/265; 375/262

(58) Field of Classification Search .......... 375/265, 375/262, 341, 358, 222, 232, 220, 221
See application file for complete search history.

(56) References Cited

U.S. PATENT DOCUMENTS

| | | | |
|---|---|---|---|
| 4,310,813 A | 1/1982 | Yuuki et al. | |
| 4,321,705 A | 3/1982 | Namiki | |
| 4,367,555 A | 1/1983 | Namiki et al. | |
| 4,438,530 A | 3/1984 | Steinberger | |
| 4,479,258 A | 10/1984 | Namiki | |
| 4,557,330 A | 12/1985 | Russell et al. | |
| 4,575,862 A | 3/1986 | Tahara et al. | |
| 4,606,054 A | 8/1986 | Amitay et al. | |
| 4,631,734 A | 12/1986 | Foschini | |
| 4,644,562 A | 2/1987 | Kavehrad et al. | |
| 4,688,235 A | 8/1987 | Tahara et al. | |
| 4,761,784 A | 8/1988 | Srinivasagopalan et al. | |
| 4,857,858 A | 8/1989 | Tahara | |
| 4,910,468 A | 3/1990 | Ohtsuka et al. | |
| 4,914,676 A | 4/1990 | Iwamatsu et al. | |
| 4,992,798 A | 2/1991 | Nozue et al. | |
| 5,023,620 A | 6/1991 | Matsuura | |
| 5,068,667 A | 11/1991 | Mizoguchi | |
| 5,075,697 A | 12/1991 | Koizumi et al. | |

(Continued)

FOREIGN PATENT DOCUMENTS

EP 1365519 A1 11/2003

(Continued)

OTHER PUBLICATIONS

Hassan, "LPDC encoded pilots for iterative receiver improvement", pp. 1-30, Dec. 2005.

(Continued)

*Primary Examiner*—Sudhanshu C Pathak
(74) *Attorney, Agent, or Firm*—D. Kligler I.P. Services Ltd.

(57) ABSTRACT

A method for communication over a communication link, which includes a transmitter and a receiver, includes transmitting and receiving data, which is encoded using a specified forward error correction (FEC) code, modulated using a specified modulation scheme and transmitted at a given power level.

One or more parameters of the communication link are monitored. A condition, which is based on values of one or more of the parameters monitored at a plurality of historical time instants, is evaluated. At least one feature of the transmitted data, selected from a group of features consisting of the FEC code, the modulation scheme and the power level, is modified based on the condition.

36 Claims, 1 Drawing Sheet

U.S. PATENT DOCUMENTS

| | | | |
|---|---|---|---|
| 5,241,320 A | 8/1993 | Mizoguchi | |
| 5,247,541 A | 9/1993 | Nakai | |
| 5,311,545 A | 5/1994 | Critchlow | |
| 5,311,546 A | 5/1994 | Paik et al. | |
| 5,383,224 A | 1/1995 | Mizoguchi | |
| 5,406,589 A | 4/1995 | Iwamatsu et al. | |
| 5,432,522 A | 7/1995 | Kurokami | |
| 5,471,508 A | 11/1995 | Koslov | |
| 5,495,502 A | 2/1996 | Andersen | |
| 5,524,027 A | 6/1996 | Huisken | |
| 5,541,951 A | 7/1996 | Juhasz et al. | |
| 5,541,955 A * | 7/1996 | Jacobsmeyer | 375/222 |
| 5,631,896 A | 5/1997 | Kawase et al. | |
| 5,710,799 A | 1/1998 | Kobayashi | |
| 5,727,032 A | 3/1998 | Jamal et al. | |
| 5,742,646 A | 4/1998 | Woolley et al. | |
| 5,809,070 A | 9/1998 | Krishnan et al. | |
| 5,838,224 A | 11/1998 | Andrews | |
| 5,838,740 A | 11/1998 | Kallman et al. | |
| 5,844,950 A | 12/1998 | Aono et al. | |
| 5,901,343 A | 5/1999 | Lange | |
| 5,905,574 A | 5/1999 | Vollbrecht et al. | |
| 5,920,595 A | 7/1999 | Iwamatsu | |
| 5,940,453 A | 8/1999 | Golden | |
| 5,987,060 A | 11/1999 | Grenon et al. | |
| 6,215,827 B1 | 4/2001 | Balachandran et al. | |
| 6,236,263 B1 | 5/2001 | Iwamatsu | |
| 6,252,912 B1 | 6/2001 | Salinger | |
| 6,466,562 B1 | 10/2002 | Yoshida et al. | |
| 6,501,953 B1 | 12/2002 | Braun et al. | |
| 6,611,942 B1 | 8/2003 | Battistello et al. | |
| 6,628,707 B2 | 9/2003 | Ratie et al. | |
| 6,647,059 B1 | 11/2003 | Faruque | |
| 6,665,810 B1 | 12/2003 | Sakai | |
| 6,826,238 B2 | 11/2004 | Ahn | |
| 6,829,298 B1 | 12/2004 | Abe et al. | |
| 6,836,515 B1 | 12/2004 | Kay et al. | |
| 6,888,794 B1 | 5/2005 | Jovanovic et al. | |
| 6,915,463 B2 | 7/2005 | Vieregge et al. | |
| 6,920,189 B1 | 7/2005 | Spalink | |
| 6,954,504 B2 | 10/2005 | Tiedemann, Jr. et al. | |
| 7,003,042 B2 | 2/2006 | Morelos-Zaragoza et al. | |
| 7,016,296 B2 | 3/2006 | Hartman, Jr. | |
| 7,046,753 B2 | 5/2006 | Resheff et al. | |
| 7,047,029 B1 | 5/2006 | Godwin et al. | |
| 7,133,425 B2 | 11/2006 | McClellan | |
| 7,133,431 B1 | 11/2006 | Barlev et al. | |
| 7,187,719 B2 | 3/2007 | Zhang | |
| 7,200,188 B2 | 4/2007 | Fague et al. | |
| 7,254,190 B2 | 8/2007 | Kwentus et al. | |
| 7,333,556 B2 | 2/2008 | Maltsev et al. | |
| 7,366,091 B1 | 4/2008 | Lahti et al. | |
| 7,460,583 B2 | 12/2008 | Khayrallah et al. | |
| 2002/0016933 A1 | 2/2002 | Smith et al. | |
| 2002/0051498 A1 | 5/2002 | Thomas et al. | |
| 2002/0061752 A1 | 5/2002 | Kurokami | |
| 2002/0181490 A1 | 12/2002 | Frannhagen et al. | |
| 2003/0021370 A1 | 1/2003 | Menkhoff | |
| 2003/0043778 A1 | 3/2003 | Luschi et al. | |
| 2003/0066082 A1 | 4/2003 | Kliger et al. | |
| 2003/0135532 A1 | 7/2003 | Peting | |
| 2004/0017860 A1 | 1/2004 | Liu | |
| 2004/0063416 A1 | 4/2004 | Kuenen et al. | |
| 2004/0081081 A1 | 4/2004 | Colombo | |
| 2004/0086668 A1 | 5/2004 | Dronzek | |
| 2004/0151108 A1 | 8/2004 | Blascoet et al. | |
| 2004/0217179 A1 | 11/2004 | Garner | |
| 2005/0002474 A1 | 1/2005 | Limberg | |
| 2005/0010853 A1 | 1/2005 | Duvant et al. | |
| 2005/0063496 A1 | 3/2005 | Guillouard et al. | |
| 2005/0075078 A1 | 4/2005 | Makinen et al. | |
| 2005/0169401 A1 | 8/2005 | Abraham et al. | |
| 2005/0190868 A1 | 9/2005 | Khandekar et al. | |
| 2005/0239398 A1 | 10/2005 | Lai | |
| 2005/0265436 A1 | 12/2005 | Suh et al. | |
| 2006/0008018 A1 | 1/2006 | Kolze | |
| 2006/0013181 A1 | 1/2006 | Stolpman et al. | |
| 2006/0107179 A1 | 5/2006 | Shen et al. | |
| 2006/0203943 A1 | 9/2006 | Scheim et al. | |
| 2006/0209939 A1 | 9/2006 | Mantha | |
| 2007/0076719 A1 | 4/2007 | Allan et al. | |
| 2007/0116143 A1 | 5/2007 | Bjerke et al. | |
| 2007/0116162 A1 | 5/2007 | Eliaz et al. | |
| 2007/0133397 A1 | 6/2007 | Bianchi et al. | |
| 2007/0153726 A1 | 7/2007 | Bar-Sade et al. | |
| 2007/0230641 A1 | 10/2007 | Yehudai | |
| 2008/0002581 A1 | 1/2008 | Gorsetman et al. | |
| 2008/0008257 A1 | 1/2008 | Yonesi et al. | |
| 2008/0043829 A1 | 2/2008 | Shiue et al. | |
| 2008/0130726 A1 | 6/2008 | Sofer et al. | |
| 2008/0254749 A1 | 10/2008 | Ashkenazi et al. | |
| 2008/0259901 A1 | 10/2008 | Friedman et al. | |
| 2009/0022239 A1 | 1/2009 | Kimura et al. | |
| 2009/0049361 A1 | 2/2009 | Koren et al. | |
| 2009/0092208 A1 | 4/2009 | Montekyo et al. | |

FOREIGN PATENT DOCUMENTS

| | | |
|---|---|---|
| JP | 6021762 A | 1/1994 |
| JP | 9064791 A | 3/1997 |
| WO | 0060802 A1 | 10/2000 |
| WO | 0077952 A1 | 12/2000 |
| WO | WO 00/76114 | 12/2000 |
| WO | 2004086668 A1 | 10/2004 |
| WO | 2006097735 A2 | 9/2006 |
| WO | 2006118892 A1 | 11/2006 |
| WO | 2007040906 A2 | 4/2007 |

OTHER PUBLICATIONS http://www.ericsson.com/products/hp/MINI_LINK_pa.shtml.

Duel-Hallen, et al., "Long range prediction of fading signals: enabling adaptive transmission for mobile radio channels", IEEE signal processing magazine, 17:3, May 2000, pp. 62-75.

Hu, et al., "Adaptive modulation using long range prediction for flat Rayleigh fading channels", Proceedings of the IEEE International Symposim on Information Theory, Sorrento, Italy, Jun. 25-30, 2000.

Gallager, "Low-Density Parity-Check Codes", IRE Transactions on Information Theory, vol. 7, Jan., 1962, pp. 21-28.

Ryan and Vasic, "An Introduction to LDPC Codes", GlobeCom 2003, San Francisco, California, Dec. 5, 2003.

Worthen and Stark, "Unified design of iterative receivers using factor graphs", IEEE Transactions on Information Theory, (47:2), Feb. 2001, pp. 843-849.

Richardson and Urbanke, "An Introduction to the Analysis of Iterative Coding Systems", Proceedings of the 1999 Institute for Mathematics and its Applications (IMA) Summer Program: codes, systems and graphical models, Minneapolis, Minnesota, Aug. 2-6, 1999.

Dennis L. Goeckel, "Adaptive coding for time-varying channels using outdated fading estimates", IEEE Transactions on communications, vol. 47, No. 6, Jun. 1999.

American National Standard T1.105-2001, "Synchronous optical network (SONET)—basic description including multiplex structure, rates and format", Alliance for Telecommunications Industry Solutions, 2001.

Benani et al., "Comparison of Carrier Recovery Techniques in M-QAM Digital Communications Systems", Proceedings of 13th Annual Canadian Conference on Electrical and Computer Engineering, pp. 73-77, Halifax, Canada, Mar. 7-10, 2000.

Best R., "Phase Locked Loops: Design, Simulation, and Applications", McGraw Hill Professional, 5th Edition, pp. 81-92, Jun. 20, 2003.

Calderbank A., "Multilevel Codes and Multistage Decoding", IEEE Transactions on Communications, vol. 37, No. 3 Mar. 1989.

Colavolpe et al., "Algorithms for iterative decoding in the presence of strong phase noise", IEEE Journal on Selected Areas in Communications, vol. 23, No. 9, pp. 1748-1757, Sep. 2005.

Dr. Lin-Nan Lee, "LDPC Codes, Application to Next Generation Communication Systems", Hughes Network System Oct. 8, 2003.

ITU Recommendation G.703, "General Aspects of Digital Transmission Systems-Terminal Equipments-Physical/Electrical Characteristics of Hierarchical Digital Interfaces", Geneva, Switzerland 1991.

ITU Recommendation G.704, "Series G: Transmission Systems and Media, Digital Systems and Networks, Digital Transmission Systems-Terminal Equipments-General, Synchronous Frame Structures used at 1544, 6312, 2048, 8448 and 44736 kbit/s hierarchical levels", Oct. 1998.

Gagnon et al., "A Simple and Fast Carrier Recovery Algorithm for High-Order QAM", IEEE Communications Letters, vol. 9, No. 10, pp. 918-920, Oct. 2005.

GR-253-Core by Telcordia Technologies, "Synchronous optical network (SONET) transport systems: common criteria" Issue 3, Sep. 2000.

Ericsson AB, "Capacity without ties; Mini-Link microwave transmission solution", EN/LZT 712 0117 R2, Molndal, Sweden, 2005.

Niu et al., "Iterative Channel Estimation and LDPC Decoding over Flat Fading Channels: A Factor Graph Approach" 2003 Conference on Information Sciences and Systems, the Johns Hopkins University, Mar. 12-14, 2003.

Imai et al., "A New Multilevel Coding Method Using Error-Correcting Codes", IEEE Transactions on Information Theory, vol. IT-23, No. 3, 1977.

ITU Recommendation G.707/Y.1322, "Series G: Transmission systems and media, digital systems and networks, digital terminal equipments -general: Series Y: global information infrastructure and internet protocol aspects—transport; Network node interface for the syncronours digital hierarchy (SDH)", Oct. 2000.

ITU Recommendation G.783, "General Aspects of Digital Transmission Systems: Terminal Equipments—Characteristics of Syncronous Digital Hierarchy (SDH) Equipment Functional Blocks", Jan. 1994.

Sun J., "An Introduction to low Density Parity Check (LDPC) Codes", West Virginia University, Jun. 3, 2003.

Johnson et al., "Blind Equalization Using the Constant Modulus Criterion: A Review", Proceedings of the IEEE, vol. 86, No. 10, Oct. 1998.

Kim et al., "Design of Carrier Recovery Algorithm for High-Order QAM with Large Frequency Acquisition Range", IEEE Internatinal Conference on Communications (ICC), pp. 1016-1020, vol. 4, Helsinki, Finland, Jun. 11-14, 2001.

Kschischang F., "Capacity Approching Codes, Iterative Decoding Algorithms and Their Application: Codes defined on Graphs", IEEE Communications Magazine, pp. 118-125, Aug. 2003.

Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Pottie et al., "Multilevel Codes based on Partitioning", IEEE Transactions on Information Theory, vol. 35, No. 1, pp. 87-98, Jan. 1989.

Richardson etr al., "Capacity Approaching codes; Iterative Decoding Algorithms and Their Application: The Renaissance of Gallager's Low-Densityy parity Check Codes", IEEE Communications Magazine, pp. 126-131, Aug. 2003.

Riegel M., "Requirements for edge-to edge estimation of time deivision multiplexed (TDM) circuits over packet switching networks", IETF Network Working Group, RFC 4197, Oct. 2005.

Saroka et al., "Joint Carrier Phase Estimation and Turbo Decoding Using Bit-Carrier-Phase APP Decoder", IEEE Transactions on Communications, 2004.

Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.

Standard T1.102-1993 of the ANSI, "American National Standard for Telecommunications-Digital Hierarchy-Electrical Interfaces", Dec. 1993.

Jin et al., "Analysis of Joint Channel Estimation and LDPC Decoding on Block Fading Channels", International Symposium on Information Theory and its Applications, ISITA2004, Parma, Italy, Oct. 10-13, 2004.

U.S. Appl. No. 11/285,414 Official Acrtion dated Mar. 6, 2009.
U.S. Appl. No. 11/285,414 Official Action dated May 23, 2008.
U.S. Appl. No. 11/285,414 Official Action dated Nov. 12, 2008.
U.S. Appl. No. 11/394,172 Official Action dated Jan. 21, 2009.
U.S. Appl. No. 11/394,172 Official Action dated Jun. 16, 2008.
U.S. Appl. No. 11/394,172 Official Action dated Jun. 26, 2009.
U.S. Appl. No. 11/479,050 Official Action dated Jul. 24, 2009.
U.S. Appl. No. 11/479,050 Official Action dated Mar. 4, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.
U.S. Appl. No. 11/634,781 Official Action dated Sep. 21, 2009.
U.S. Appl. No. 11/645,828 Official Action dated Sep. 15, 2009.

* cited by examiner

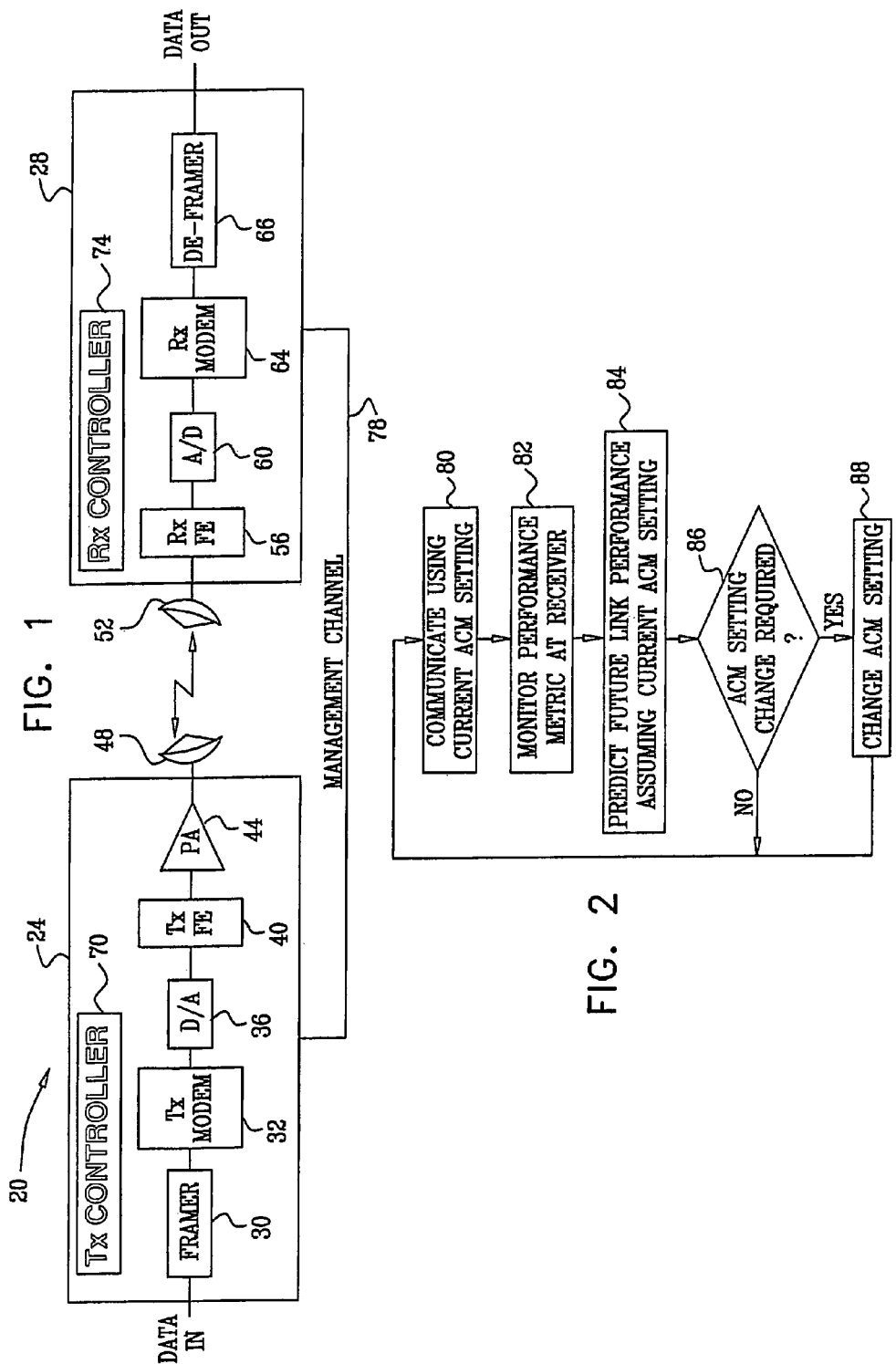

ADAPTIVE CODING AND MODULATION BASED ON LINK PERFORMANCE PREDICTION

FIELD OF THE INVENTION

The present invention relates generally to communication systems, and particularly to methods and systems for using adaptive coding and modulation (ACM) in communication links.

BACKGROUND OF THE INVENTION

Various methods for predicting the future conditions of a wireless communication channel are known in the art. For example, a channel prediction method is described by Duel-Hallen et al., in "Long Range Prediction of Fading Signals: Enabling Adaptive Transmission for Mobile Radio Channels," IEEE Signal Processing Magazine, (17:3), May, 2000, pages 62-75, which is incorporated herein by reference. The method computes the linear Minimum Mean Squared Error (MMSE) estimates of future fading coefficients based on past observations.

Channel prediction is sometimes used for adaptive transmission. For example, an application of the method proposed by Duel-Hallen et al. to adaptive modulation is described by Hu et al., in "Adaptive Modulation Using Long Range Prediction for Flat Rayleigh Fading Channels," Proceedings of the IEEE International Symposium on Information Theory, Sorrento, Italy, Jun. 25-30, 2000, which is incorporated herein by reference.

As another example, U.S. Pat. No. 5,541,955, whose disclosure is incorporated herein by reference, describes an adaptive data rate modem, which supports multiple data rates. The modem incorporates an adaptive data rate encoder and an adaptive data rate decoder. Soft decision metrics of the decoder are used to provide an estimate of the signal-to-noise ratio (SNR). An optional predictor receives the SNR estimate from the decoder and predicts the future signal-to-noise ratio, to determine the desired data rate for the modem.

SUMMARY OF THE INVENTION

There is therefore provided, in accordance with an embodiment of the present invention, a method for communication over a communication link that includes a transmitter and a receiver, the method including:

transmitting and receiving data, which is encoded using a specified forward error correction (FEC) code, modulated using a specified modulation scheme and transmitted at a given power level;

monitoring one or more parameters of the communication link;

evaluating a condition based on values of one or more of the parameters monitored at a plurality of historical time instants; and based on the condition, modifying at least one feature of the transmitted data, selected from a group of features consisting of the FEC code, the modulation scheme and the power level.

In some embodiments, the transmitter and the receiver are part of a wireless communication link. Alternatively, the transmitter and the receiver are part of a wireline communication link.

In another embodiment, transmitting the data includes encoding and modulating the data in accordance with an adaptive coding and modulation (ACM) setting selected from a plurality of predetermined ACM settings, and modifying the at least one feature includes selecting a different ACM setting from among the plurality.

In yet another embodiment, the modulation scheme defines symbols that are used in modulating the data at the transmitter, and monitoring the parameters includes calculating the parameters over at least one subset of the symbols received by the receiver selected from a group of subsets consisting of a predetermined portion of the symbols and a pseudo-randomly-selected portion of the symbols.

Modifying the at least one feature may include synchronizing the modified at least one feature between the transmitter and the receiver.

In some embodiments, evaluating the condition includes predicting a future performance of the communication link assuming the communication link were to continue using the specified FEC code, the specified modulation scheme and the given power level. Predicting the future performance sometimes includes fitting a function to values of the monitored parameters, and calculating a future value of the function. Additionally or alternatively, predicting the future performance may include estimating future values of the monitored parameters using a Kalman filter.

In another embodiment, the modulation scheme defines symbols that are used in modulating the data at the transmitter, and the monitored parameters include a mean square error (MSE) of at least part of the symbols received by the receiver. In yet another embodiment, the monitored parameters include a radial MSE of at least part of the symbols received by the receiver.

The monitored parameters may include at least one error rate selected from a group of error rates consisting of a coded bit error rate (BER) after error correction by the FEC code and an uncoded BER before error correction by the FEC code of at least part of the data received by the receiver. Additionally or alternatively, the monitored parameters may include a received signal level (RSL) at the receiver.

In some embodiments, receiving the data includes equalizing the data using an adaptive equalizer that includes multiple coefficients, and the monitored parameters include a performance metric based on values of the coefficients. The performance metric may include a ratio between a power of a coefficient having a maximum absolute value among the equalizer coefficients and a total power of the equalizer coefficients. Alternatively, the performance metric includes a ratio between a power of a coefficient having a maximum absolute value among the equalizer coefficients and a total power of the equalizer coefficients excluding the coefficient having the maximum absolute value.

In a disclosed embodiment, the FEC code includes an iteratively-decoded code, receiving the data includes decoding the FEC code at the receiver using an iterative decoding process that produces a code metric, and monitoring the parameters includes monitoring the code metric. The code metric may include at least one metric selected from a group of metrics consisting of a likelihood ratio (LR) and a log likelihood ratio (LLR).

There is also provided, in accordance with an embodiment of the present invention, a communication link, including:

a transmitter, which is arranged to transmit data, which is encoded using a specified forward error correction (FEC) code, modulated using a specified modulation scheme and transmitted at a given power level;

a receiver, which is arranged to receive the data transmitted by the transmitter and to monitor one or more parameters of the communication link responsively to the received data; and a controller, which is associated with at least one of the transmitter and the receiver and is arranged to evaluate a condition based on values of the parameters monitored at a plurality of historical time instants and, based on the condition, to modify at least one feature selected from a group of features consisting of the FEC code, the modulation scheme and the power level.

There is additionally provided, in accordance with an embodiment of the present invention, a method for communication over a communication link that includes a transmitter and a receiver, the method including:

transmitting and receiving data, which is encoded using a forward error correction (FEC) code, modulated using a modulation scheme and transmitted at a power level;

monitoring coefficient values of an adaptive equalizer used for equalizing the modulated data received by the receiver; and responsively to the monitored coefficient values, modifying at least one feature of the transmitted data, selected from a group of features consisting of the FEC code, the modulation scheme and the power level.

There is further provided, in accordance with an embodiment of the present invention, a method for communication over a communication link that includes a transmitter and a receiver, the method including:

transmitting and receiving data, which is encoded using a forward error correction (FEC) code, modulated using a modulation scheme and transmitted at a power level;

monitoring a radial mean square error (MSE) of at least part of the modulated data received by the receiver; and responsively to the monitored radial MSE, modifying at least one feature of the transmitted data, selected from a group of features consisting of the FEC code, the modulation scheme and the power level.

The present invention will be more fully understood from the following detailed description of the embodiments thereof, taken together with the drawings in which:

BRIEF DESCRIPTION OF THE DRAWINGS

FIG. 1 is a block diagram that schematically illustrates a communication link, in accordance with an embodiment of the present invention; and FIG. 2 is a flow chart that schematically illustrates a method for adapting the coding and/or modulation of a communication link based on predicted performance, in accordance with an embodiment of the present invention.

DETAILED DESCRIPTION OF EMBODIMENTS

Overview

Some communication links adapt their modulation scheme, error correction code and/or transmit power level in order to provide reliable performance under varying channel conditions. In some cases, the link predicts the future channel conditions in order to reduce the response time of the adaptation, i.e., the time from the occurrence of a change in channel conditions until the link begins to operate at the updated setting.

Embodiments of the present invention provide improved methods and systems for adapting the modulation and coding scheme, as well as the power level used by a communication link. While the communication link operates in a certain modulation/coding/power configuration, the receiver monitors one or more parameters, such as performance metrics of the link. The monitored parameters may comprise performance metrics such as bit error rate (BER) and mean square error (MSE). Based on the monitored performance metrics, a system controller predicts the expected future performance of the link, assuming the link were to continue using the current configuration. Typically, the system controller bases the decision on a number of performance metric values, monitored at multiple time instants in a time interval that precedes the decision instant. These metric values are also referred to as historical metric values.

If the controller determines that the predicted link performance using the current configuration violates a certain predetermined condition, the controller selects a different modulation/coding/power configuration and the link switches to the new configuration.

Unlike some known adaptation methods which first predict the future conditions of the communication channel and then adapt the coding, modulation or power to match the predicted channel conditions, the methods and systems described herein explicitly and directly predict the anticipated future performance of the link, if it were to continue using the currently-used coding and modulation. Therefore, the methods and systems described herein are expected to provide a more reliable and accurate adaptation in comparison with known methods.

System Description

FIG. 1 is a block diagram that schematically illustrates a communication link 20, in accordance with an embodiment of the present invention. Link 20 comprises a transmitter 24, which accepts input data and transfers it to a receiver 28. The link may comprise a microwave link, a millimeter-wave link or any other suitable wireless or wired link.

Link 20 may comprise a standalone point-to-point link or may be part of a point-to-multipoint communication system. For the sake of conceptual clarity, the description that follows refers to a unidirectional link. Typically, however, link 20 is part of a bidirectional link between two communication systems, wherein each system comprises a transmitter similar to transmitter 24 and a receiver similar to receiver 28.

The data input to transmitter 24 is formatted and encapsulated in data frames by a framer 30. The data frames are encoded and modulated by a transmit (TX) modem 32. In some embodiments, the TX modem encodes the input data with a forward error correction (FEC) code. Typically, the FEC has a code rate between 0.5 and approaching unity, although any suitable FEC code and code rate can be used.

The TX modem modulates the encoded data in accordance with a particular modulation scheme, typically by mapping bits or groups of bits to symbols selected from a particular signal constellation. For example, TX modem 32 may use quaternary phase shift keying (QPSK), 16-symbol quadrature-amplitude modulation (16-QAM), 256-QAM, or any other suitable modulation scheme.

The modulated symbols produced by TX modem 32 are converted to an analog signal by a digital-to-analog (D/A) converter 36. The analog signal is filtered, amplified and up-converted to a suitable radio frequency by a transmitter front-end (TX FE) 40. The radio signal is amplified by a power amplifier (PA) 44 and transmitted to receiver 28 via a transmit (TX) antenna 48.

The signal transmitted by transmitter 24 is received by a receive (RX) antenna 52. A receiver front end (RX FE) 56 down-converts the signal to a suitable intermediate frequency (IF) or to baseband. The RX FE may also perform functions such as low-noise amplification, filtering, gain control, equalization, synchronization and carrier recovery. The signal produced by the RX FE is digitized by an analog-to-digital (A/D) converter 60. The digitized signal is provided to a receive (RX) modem 64. The RX modem demodulates the received symbols and decodes the FEC, so as to reconstruct the data frames. The RX modem may also perform functions such as filtering, gain control, equalization, synchronization and carrier recovery. A de-framer 66 extracts the data from the data frames and provides the extracted data as output.

TX modem 32 and RX modem 64 comprise variable-rate modems. In some embodiments, modems 32 and 64 use adaptive coding and modulation (ACM). In ACM, the FEC code rate and the signal constellation used for modulation are jointly selected to produce the desired data rate and/or quality of service. Typically, two or more combinations of code rate and signal constellation are predefined. Each combination of code rate and signal constellation is referred to herein as an ACM setting. A suitable ACM setting is selected and coordinated between the TX and RX modems.

As will be explained in detail below, the desired ACM setting is selected by monitoring the link performance, predicting the future performance of the link based on the monitored performance, and selecting an ACM setting based on the predicted performance.

Transmitter 24 comprises a TX controller 70, and receiver 28 comprises an RX controller 74. The TX and RX controllers respectively manage the operation of the transmitter and receiver, and in particular monitor the performance of the link and coordinate ACM setting changes. Controllers 70 and 74 can be jointly viewed as a system controller, which carries out the methods described herein. The different performance monitoring, prediction and ACM setting adaptation functions can be partitioned between controllers 70 and 74 as desired.

The TX and RX controllers coordinate the ACM setting changes, and otherwise communicate with one another, by exchanging management information over a management channel 78. For example, the TX controller may send information to the RX controller by embedding management information in the data frames produced by framer 30. When link 20 is part of a bidirectional communication link, the RX channel may send information to the TX controller by embedding management information in data frames of the opposite link direction.

ACM Setting Adaptation Based on Predicted Link Performance

Link 20 adapts its ACM settings in order to provide reliable performance under varying channel conditions. When channel conditions are good, the link may select ACM settings having a high number of constellation symbols and/or a high code rate, thus increasing the transmitted data rate. When channel conditions deteriorate, ACM settings having fewer constellation symbols and/or lower code rate are selected, thus improving the robustness of the link at the expense of reduced data rate. Typically, ACM settings are selected so that the link complies with certain quality of service (QoS) requirements. Alternatively, the ACM setting can be adapted to comply with any other suitable condition.

Adapting the ACM setting in response to changing channel conditions has a certain response time. In the present context, the response time interval is defined as the time period from the occurrence of a change in channel conditions, until the link begins to operate at an updated ACM setting that matches this change. In many practical cases, channel conditions change rapidly. For example, when the channel experiences fading, its attenuation sometimes changes at a rate on the order of 100 dB per second or more.

It is generally desirable that link 20 be able to switch to a new ACM setting before the currently-used ACM setting stops matching the channel conditions and causes degraded performance (e.g., BER degradation). Therefore, the length of the response time interval may have a significant effect on the link performance.

For example, when channel conditions deteriorate and the response time is long, data transmitted during the response interval may be fully or partially lost. Moreover, the effective data rate of the link may be reduced, the bit error rate (BER) may be degraded and the data latency may increase. In some cases, the link may lose synchronization and some of the receiver loops (e.g., carrier recovery and automatic gain control) may unlock. As another example, when channel conditions improve, such as when recovering from a fade, the link may operate at an unnecessarily-low data rate during the response time.

Moreover, when the response time is long, the user may revert to using excessive link budget margins before making the switch, in order to compensate for the lengthy adaptation. As a result, the link may operate at an unnecessarily low ACM setting (i.e., slower data rate). Such a selection of ACM setting causes significant reduction in link capacity.

In order to shorten the response time of adapting ACM settings, link 20 adapts its ACM setting by predicting the anticipated future performance of the link. In some embodiments, the receiver monitors one or more performance metrics of the link over time. Using the monitored metrics, the system controller (i.e., TX controller 70, RX controller 74 or both) predicts the future performance of the link, assuming the link were to continue operating at the currently-used ACM setting. If the predicted link performance is not acceptable, or otherwise violates a predetermined condition, the system controller changes the ACM setting of the link accordingly.

The system controller may use any suitable performance metric for predicting the future performance of the link. For example, the controller may calculate or estimate the mean square error (MSE) of the received signal. In some cases, the MSE can be estimated over only part of the received symbols. The selection of symbols, which participate in the MSE estimation, may be fixed (e.g., the symbols located at a certain region in each data frame) or variable (e.g., pseudo-randomly changing locations in the data frame).

When symbols are received by the RX modem, each received symbol is represented as a two-dimensional signal point in the In-phase/Quadrature (I/Q) plane. The RX modem demodulates the received symbols by mapping each signal point to one of the nominal constellation symbols. The difference vector between the received symbol signal point and the corresponding constellation symbol is referred to as the error vector.

The MSE is defined as the average error vector magnitude, squared and averaged over multiple symbols. A large MSE value typically corresponds to a high error rate, i.e., degraded link performance, and vice versa. Thus, a prediction of the future MSE of the link can serve as a good indication of future link performance.

The MSE metric can be calculated over all received symbols or over only part of the symbols. The RX modem can also make ACM setting switching decisions based on current MSE values, calculated over any desired group of symbols, instead of predicting future MSE values.

In some embodiments, the RX modem estimates the radial MSE of the received symbols, and the radial MSE is used as a performance metric and as the basis for prediction. The radial MSE is calculated by considering only the radial components of the error vectors. In other words, for each received symbol, only the component of the error vector along a ray, which projects from the origin of the I/Q plane and crosses the received symbol's signal point, is measured. Radial MSE is particularly suitable for differentiating between thermal noise and phase noise (which is usually channel-independent). Thus, radial MSE is sometimes more accurate in predicting the link performance under high phase noise scenarios. Radial MSE can be calculated over some or all of the received symbols. The RX modem can also make ACM setting switching decisions based on the current radial MSE value, instead of predicting future radial MSE values.

In some embodiments, an estimate of the bit error rate (BER) is used as a basis for prediction. For example, the RX modem can calculate the number of bit errors corrected by the FEC in each data frame. The RX modem may compare the uncorrected data bits at the input of the FEC decoder to the corresponding bits at the decoder output, and count the number of corrected errors per frame.

The received signal level (RSL), as measured by the RX modem, can also serve as a performance metric and as a basis for prediction of the future link performance.

In some embodiments, the RX model comprises an adaptive equalizer. The equalizer typically comprises a digital filter with programmable coefficients, whose values are adapted in order to equalize the response of the channel. In some cases, the values of the equalizer coefficients can provide a good indication of an approaching performance degradation, and can be used as performance metrics.

For example, the metric may comprise a ratio between the energy of the coefficient having the largest absolute value and between the total energy of all equalizer coefficients. Alternatively, the metric may comprise a ratio between the energy of the largest absolute value coefficient and between the total energy of all other equalizer coefficients, excluding the largest coefficient. The metric may be based either on current values or on predicted (e.g., extrapolated) values of the equalizer coefficients.

In many cases, exceedingly low values of these ratios indicate that the channel response is non-uniform and may be used as an early indication of performance degradation. Thus, the metric value can be compared to a predetermined threshold in order to determine whether or not performance degradation is approaching. Let $C_i$, $i=1 \ldots N$, denote the equalizer coefficients and $C_{max}$ denote the coefficient having the maximum absolute value, the two alternative metrics can be written as $$\frac{|C_{max}|^2}{\sum_{i=1 \ldots N} |C_i|^2} \text{ and } \frac{|C_{max}|^2}{\sum_{i=1 \ldots N, i \neq max} |C_i|^2}.$$

In some embodiments, the FEC code used by the TX and RX modems comprises an iteratively-decoded code, such as a low density parity check (LDPC) code or a turbo-code. Iteratively-decoded FEC codes are decoded by iterative decoding processes, which compute and use statistical metrics of the received symbols, such as likelihood ratios (LR) and log-likelihood ratios (LLR). LDPC codes are described, for example, by Gallager in "Low-Density Parity-Check Codes," IRE Transactions on Information Theory, Volume 7, January, 1962, pages 21-28, and by Ryan and Vasic in "An Introduction to LDPC Codes," GlobeCom 2003, San Francisco, Calif., Dec. 5, 2003, which are incorporated herein by reference.

Iterative decoding processes are described, for example, by Worthen and Stark in "Unified Design of Iterative Receivers using Factor Graphs," IEEE Transactions on Information Theory, (47:2), February, 2001, pages 843-849, and by Richardson and Urbanke in "An Introduction to the Analysis of Iterative Coding Systems," Proceedings of the 1999 Institute for Mathematics and its Applications (IMA) Summer program: Codes, Systems and Graphical Models, Minneapolis, Minn., Aug. 2-6, 1999, which are also incorporated herein by reference.

When the data transmitted over link 20 is encoded with an iteratively-decoded FEC code, the statistical metrics produced by the iterative decoding process can be used as performance metrics, and predicting their future values can be used as good indication of the future link performance. The statistical metrics (e.g., LR and LLR) are usually adapted during the iterative decoding process. Both the initial values and the final values of these metrics, i.e., before and after the decoding process is carried out, can be used as performance metrics. The number of uncorrected errors and/or the percentage of code words which contain uncorrected errors can also be used as prediction metrics. These parameters, which are often provided by the iterative decoding process, are indicative of the residual error rate of the link after error correction.

The performance metrics used for prediction are typically dependent on the ACM setting being used. For example, MSE-based metrics and BER estimation are modulation-dependent. Other metrics, such as metrics derived from an iterative FEC decoding process, depend on both the specific modulation and the specific code rate being used. As such, basing the prediction on these metrics often provides a more explicit and accurate estimate as to how the currently-used ACM setting will perform at a future point in time.

The system controller may use various methods for predicting the future link performance based on the monitored performance metrics. For example, the controller may fit the time-dependence of the monitored performance metric values with a suitable function, such as a linear, polynomial or rational function. The controller then extrapolates the function to produce expected values of the metric. Alternatively, the system controller may predict the future metric value using a Kalman filter, as is known in the art, or using any other suitable filtering or prediction process.

In some embodiments, the receiver monitors two or more performance metrics, and the system controller predicts the future link performance and/or bases its decision to change the ACM setting on the multiple metrics. In some cases, using two or more metrics based on uncorrelated mechanisms, such as combining MSE prediction and equalizer coefficient prediction, may improve the prediction accuracy.

In many practical cases, predicting the performance of the link approximately 10 ms in advance enables the link to operate with sufficiently small margins and perform reliable ACM setting switches. Alternatively, any other suitable prediction interval can be used.

FIG. 2 is a flow chart that schematically illustrates a method for adapting the coding and/or modulation of a link 20 based on predicted future performance, in accordance with an embodiment of the present invention. The method begins with link 20 communicating using a certain ACM setting, at a communication step 80. During communication, RX modem 64 measures one or more performance metrics, at a monitoring step 82.

Based on the monitored metrics, the system controller predicts the future performance of link 20, at a prediction step 84. The controller estimates the anticipated performance of the link at a future point in time, assuming the link were to continue using the currently-used ACM setting. For example, the controller may predict that the BER performance of the link is anticipated to drop to an unacceptable level. As another example, the controller may predict that the MSE at the receiver is expected to deteriorate beyond a predetermined threshold.

The system controller checks whether, based on the performance prediction, an ACM change is required, at an adaptation checking step 86. If the prediction results indicate that the currently-used ACM setting can be maintained, the method loops back to communication step 80 above.

If, on the other hand, the performance prediction indicates that the ACM setting should be changed, the controller initiates an ACM setting change, at an adaptation step 88. The system controller may initiate a change, for example, when the performance of the current ACM setting is predicted to deteriorate to an unacceptable level, or when the performance of the current ACM setting is predicted to be sub-optimal in terms of the achievable data rate. Alternatively, the system controller may evaluate any other condition in order to determine whether the performance prediction indicates a need to change the current ACM setting.

At step 88, the controller selects a different ACM setting to replace the current setting. The set of possible ACM settings used in link 20 is usually sorted in ascending order of robustness, which usually corresponds to a descending order of data rate. When the predicted performance indicates a need to improve the link robustness at the expense of data rate, the controller may select the ACM setting that immediately follows the current setting in the order of robustness, or any other suitable ACM setting. When the predicted performance indicates a possibility to increase the link data rate, the controller may select the ACM setting that immediately follows the current setting in terms of data rate, or any other suitable setting. The system controller may predict the future performance of any of the ACM settings, in order to determine to which ACM setting to switch.

The system controller causes the indication of the new ACM setting to be propagated to framer 30, TX modem 32, RX modem 64 and de-framer 66. The system controller may use any suitable method for coordinating and synchronizing the change in ACM setting between the elements of transmitter 24 and receiver 28. For example, in some embodiments each data frame comprises an ACM field, which indicates the ACM setting used in the next frame. Alternatively, the ACM field may indicate the ACM setting of the current frame or of a frame having any other offset with respect to the current frame. The system controller, using framer 30, inserts the desired ACM setting indication into the ACM setting fields of the data frames. When the data frames traverse the link, the modems and the de-framer extract the contents of the ACM setting fields and configure their ACM settings accordingly.

After changing to the new ACM setting, the method loops back to communication step 80 above. The link then begins to communicate using the newly-updated setting. Because the change in ACM setting is based on a prediction of the link performance, the response time is reduced, enabling smooth transition between ACM settings.

In some embodiments, other properties of link 20 can be changed based on the prediction of future link performance, either instead of or in addition to changing the ACM setting of the link. For example, the output power level of the transmitter can be increased or decreased based on the predicted future link performance.

Although the embodiments described herein mainly address wireless point-to-point links, the principles of the present invention can also be used in other applications, such as satellite links and Digital Subscriber Line (DSL) links.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
in a communication system that includes a transmitter and a receiver, transmitting and receiving data, which is encoded using a specified forward error correction (FEC) code, modulated using a specified modulation scheme and transmitted at a given power level;
monitoring one or more parameters of the received data;
predicting, based on values of one or more of the parameters monitored at a plurality of historical time instants, a future performance of the communication system, assuming the communication system were to continue using the specified FEC code, the specified modulation scheme and the given power level; and
based on the predicted future performance, modifying at least one feature of the transmitted data, selected from a group of features consisting of the FEC code, the modulation scheme and the power level.

2. The method according to claim 1, wherein the transmitter and the receiver are part of a wireless communication link.

3. The method according to claim 1, wherein the transmitter and the receiver are part of a wireline communication link.

4. The method according to claim 1, wherein transmitting the data comprises encoding and modulating the data in accordance with an adaptive coding and modulation (ACM) setting selected from a plurality of predetermined ACM settings, and wherein modifying the at least one feature comprises selecting a different ACM setting from among the plurality.

5. The method according to claim 1, wherein the modulation scheme defines symbols that are used in modulating the data at the transmitter, and wherein monitoring the parameters comprises calculating the parameters over at least one subset of the symbols received by the receiver selected from a group of subsets consisting of a predetermined portion of the symbols and a pseudo-randomly-selected portion of the symbols.

6. The method according to claim 1, wherein modifying the at least one feature comprises synchronizing the modified at least one feature between the transmitter and the receiver.

7. The method according to claim 1, wherein predicting the future performance comprises fitting a function to values of the monitored parameters, and calculating a future value of the function.

8. The method according to claim 1, wherein predicting the future performance comprises estimating future values of the monitored parameters using a Kalman filter.

9. The method according to claim 1, wherein the modulation scheme defines symbols that are used in modulating the data at the transmitter, and wherein the monitored parameters comprise a mean square error (MSE) of at least part of the symbols received by the receiver.

10. The method according to claim 1, wherein the modulation scheme defines symbols that are used in modulating the data at the transmitter, and wherein the monitored parameters comprise a radial MSE of at least part of the symbols received by the receiver.

11. The method according to claim 1, wherein the monitored parameters comprise at least one error rate selected from a group of error rates consisting of a coded bit error rate (BER) after error correction by the FEC code and an uncoded BER before error correction by the FEC code of at least part of the data received by the receiver.

12. The method according to claim 1, wherein the monitored parameters comprise a received signal level (RSL) at the receiver.

13. The method according to claim 1, wherein receiving the data comprises equalizing the data using an adaptive equalizer that includes multiple coefficients, and wherein the monitored parameters comprise a performance metric based on values of the coefficients.

14. The method according to claim 13, wherein the performance metric comprises a ratio between a power of a coefficient having a maximum absolute value among the equalizer coefficients and a total power of the equalizer coefficients.

15. The method according to claim 13, wherein the performance metric comprises a ratio between a power of a coefficient having a maximum absolute value among the equalizer coefficients and a total power of the equalizer coefficients excluding the coefficient having the maximum absolute value.

16. The method according to claim 1, wherein the FEC code comprises an iteratively-decoded code, wherein receiving the data comprises decoding the FEC code at the receiver using an iterative decoding process that produces a code metric, and wherein monitoring the parameters comprises monitoring the code metric.

17. The method according to claim 16, wherein the code metric comprises at least one metric selected from a group of metrics consisting of a likelihood ratio (LR) and a log likelihood ratio (LLR).

18. A communication system, comprising:
a transmitter, which is arranged to transmit data that is encoded using a specified forward error correction (FEC) code, modulated using a specified modulation scheme and transmitted at a given power level;
a receiver, which is arranged to receive the data transmitted by the transmitter and to monitor one or more parameters of the received data; and
a controller, which is associated with at least one of the transmitter and the receiver and is arranged to predict, based on values of the parameters monitored at a plurality of historical time instants, a future performance of the communication system, assuming the communication system were to continue using the specified FEC code, the specified modulation scheme and the given power level, and, based on the predicted future performance, to modify at least one feature selected from a group of features consisting of the FEC code, the modulation scheme and the power level.

19. The system according to claim 18, wherein the transmitter is arranged to send the data to the receiver over a wireless channel.

20. The system according to claim 18, wherein the transmitter is arranged to send the data to the receiver over a wireline channel.

21. The system according to claim 18, wherein the transmitter is arranged to encode and modulate the data in accordance with an adaptive coding and modulation (ACM) setting selected from a plurality of predetermined ACM settings, and wherein the controller is arranged to modify the at least one feature by selecting a different ACM setting from the plurality.

22. The system according to claim 18, wherein the modulation scheme defines symbols that are used in modulating the data at the transmitter, and wherein the controller is arranged to monitor the parameters by calculating the parameters over at least one subset of the symbols received by the receiver selected from a group of subsets consisting of a predetermined portion of the symbols and a pseudo-randomly-selected portion of the symbols.

23. The system according to claim 18, wherein the controller is arranged to synchronize the modified at least one of feature between the transmitter and the receiver.

24. The system according to claim 18, wherein the controller is arranged to predict the future performance by fitting a function to values of the monitored parameters and calculating a future value of the function.

25. The system according to claim 18, wherein the controller is arranged to predict the future performance by estimating future values of the parameters using a Kalman filter.

26. The system according to claim 18, wherein the modulation scheme defines symbols that are used in modulating the data at the transmitter, and wherein the monitored parameters comprise a mean square error (MSE) of at least some of the symbols received by the receiver.

27. The system according to claim 18, wherein the modulation scheme defines symbols that are used in modulating the data at the transmitter, and wherein the monitored parameters comprise a radial MSE of at least some of the symbols received by the receiver.

28. The system according to claim 18, wherein monitored parameters comprise at least one error rate selected from a group of error rates consisting of a coded bit error rate (BER) after error correction by the FEC code and an uncoded BER before error correction by the FEC code of at least part of the data received by the receiver.

29. The system according to claim 18, wherein the monitored parameter comprises a received signal level (RSL) at the receiver.

30. The system according to claim 18, wherein the receiver comprises an adaptive equalizer, which comprises multiple coefficients and is arranged to equalize the data, and wherein the monitored parameters comprise a performance metric based on the equalizer coefficients.

31. The system according to claim 30, wherein the performance metric comprises a ratio between a power of a coefficient having a maximum absolute value among the equalizer coefficients and a total power of the equalizer coefficients.

32. The system according to claim 30, wherein the performance metric comprises a ratio between a power of a coefficient having a maximum absolute value among the equalizer coefficients and a total power of the equalizer coefficients excluding the coefficient having the maximum absolute value.

33. The system according to claim 18, wherein the FEC code comprises an iteratively-decoded code, wherein the receiver comprises a decoder, which is arranged to decode the FEC code using an iterative decoding process that produces a code metric, and wherein the monitored parameters comprise the code metric.

34. The system according to claim 33, wherein the code metric comprises at least one metric selected from a group of metrics consisting of a likelihood ratio (LR) and a log likelihood ratio (LLR).

35. A method for communication over a communication link that includes a transmitter and a receiver, the method comprising:

transmitting and receiving data, which is encoded using a forward error correction (FEC) code, modulated using a modulation scheme and transmitted at a power level;

monitoring coefficient values of an adaptive equalizer used for equalizing the modulated data received by the receiver; and responsively to the monitored coefficient values, modifying at least one feature of the transmitted data, selected from a group of features consisting of the FEC code, the modulation scheme and the power level.

36. A method for communication over a communication link that includes a transmitter and a receiver, the method comprising:

transmitting and receiving data, which is encoded using a forward error correction (FEC) code, modulated using a modulation scheme and transmitted at a power level;

monitoring a radial mean square error (MSE) of at least part of the modulated data received by the receiver; and responsively to the monitored radial MSE, modifying at least one feature of the transmitted data, selected from a group of features consisting of the FEC code, the modulation scheme and the power level.

* * * * *